US009636963B2

(12) United States Patent
Smith et al.

(10) Patent No.: US 9,636,963 B2
(45) Date of Patent: May 2, 2017

(54) FLUID SPRING AND RUBBER SPRING ASSEMBLY

(71) Applicant: Firestone Industrial Products Company, LLC, Indianapolis, IN (US)

(72) Inventors: Jason B. Smith, Avon, IN (US); David D. Jackson, Noblesville, IN (US)

(73) Assignee: Firestone Industrial Products Company, LLC, Indianapolis, IN (US)

( * ) Notice: Subject to any disclaimer, the term of this patent is extended or adjusted under 35 U.S.C. 154(b) by 38 days.

(21) Appl. No.: 14/404,296

(22) PCT Filed: May 29, 2013

(86) PCT No.: PCT/US2013/043166
§ 371 (c)(1),
(2) Date: Nov. 26, 2014

(87) PCT Pub. No.: WO2013/181282
PCT Pub. Date: Dec. 5, 2013

(65) Prior Publication Data
US 2015/0165853 A1 Jun. 18, 2015

Related U.S. Application Data

(60) Provisional application No. 61/652,412, filed on May 29, 2012.

(51) Int. Cl.
*B60G 11/62* (2006.01)
*B61F 5/30* (2006.01)
(Continued)

(52) U.S. Cl.
CPC .............. *B60G 11/62* (2013.01); *B61F 5/305* (2013.01); *B61F 5/307* (2013.01); *F16F 9/057* (2013.01);
(Continued)

(58) Field of Classification Search
CPC .............. B60G 11/62; B60G 2202/152; B60G 2202/143; B60G 11/27; B60G 2206/424;
(Continued)

(56) References Cited

U.S. PATENT DOCUMENTS 5,707,045 A * 1/1998 Easter .............. B60G 17/01933
188/1.11 E
6,386,525 B1 * 5/2002 Stuart ..................... F16F 9/052
267/64.22

FOREIGN PATENT DOCUMENTS

EP 1726505 11/2006
EP 2251562 11/2010
(Continued)

OTHER PUBLICATIONS

International Search Report and Written Opinion for corresponding patent application No. PCT/US2013/043166.

*Primary Examiner* — Mark Lee
(74) *Attorney, Agent, or Firm* — Thomas R. Kingsbury; Fay Sharpe LLP (57) ABSTRACT

An end member assembly (204; 404) that is dimensioned for use in forming a gas spring assembly (200; 400) can include an end member body (248; 448) that is dimensioned for securement to a flexible spring member (206; 406) of the gas spring assembly (200; 400). The end member assembly (204; 404) can also include a compliant support structure (250; 450) that is operatively connected to the end member body (248; 448) to support the end member body in spaced relation to an associated structural component (SC2). The end member body (248; 448) can include a side wall (256; 456) that extends in overlapping (OL1; OL2) relation with at least a portion of the compliant support structure (250; 450). The end member (204; 404) can also form at least one chamber (296; 508) within the end member body (248; 448)
(Continued)

and compliant support structure (250; 450). A gas spring assembly (200; 400) and a suspension system (118) are also included.

20 Claims, 4 Drawing Sheets

(51) Int. Cl.
  *F16F 9/05* (2006.01)
  *F16F 13/00* (2006.01)
(52) U.S. Cl.
  CPC ........ *F16F 13/002* (2013.01); *B60G 2202/14* (2013.01); *B60G 2202/152* (2013.01)
(58) Field of Classification Search
  CPC ................ B60G 15/12; B60G 2202/14; B60G 2204/126; B60G 2202/15; B60G 2204/125; B60G 2204/4502; B60G 2300/10; B61F 5/307; B61F 5/305; B61F 5/30; F16F 9/052; F16F 13/002; F16F 9/057; F16F 9/05; F16F 13/00
  See application file for complete search history.

(56) References Cited

FOREIGN PATENT DOCUMENTS

| | | | |
|---|---|---|---|
| FR | 2250046 | | 5/1975 |
| JP | 2008-302902 | | 12/2008 |
| JP | 2009-052604 | | 3/2009 |
| JP | 2010-127350 | | 6/2010 |
| JP | 2010-127350 | * | 8/2010 |
| JP | 2011-002000 | | 1/2011 |

* cited by examiner

FLUID SPRING AND RUBBER SPRING ASSEMBLY

This application is the National Stage of International Application No. PCT/US2013/043166, filed on May 29, 2013, which claims the benefit of priority from U.S. Provisional Patent Application No. 61/652,412 filed on May 29, 2012, the subject matter of which is hereby incorporated herein by reference in its entirety.

BACKGROUND

The subject matter of the present disclosure broadly relates to the art of spring devices and, more particularly, to an end member assembly for rolling lobe-style gas spring assemblies that includes an end member body and a compliant support structure. Gas spring assemblies and suspension systems including such an end member assembly are also included.

The subject matter of the present disclosure is capable of broad application and use in connection with a variety of applications and/or environments. However, the subject matter finds particular application and use in conjunction with rail vehicles, and will be described herein with particular reference thereto. It is to be appreciated, though, that the subject matter of the present disclosure is amenable to use in connection with other applications and/or environments.

A suspension system, such as may be used in connection with motorized vehicles and/or rolling-stock rail vehicles, for example, can include one or more spring elements for accommodating forces and loads associated with the operation and use of the corresponding device (e.g., a motorized vehicle) to which the suspension system is operatively connected. In such applications, it is often considered desirable to utilize spring elements that operate at a lower spring rate, as a reduced spring rate can favorably influence certain performance characteristics, such as vehicle ride quality and comfort, for example. That is, it is well understood in the art that the use of a spring element having a higher spring rate (i.e. a stiffer spring) will transmit a greater magnitude of inputs (e.g., inputs due to variations in the rails of a track) to the sprung mass and that, in some applications, this could undesirably affect the sprung mass, such as, for example, by resulting in a rougher, less-comfortable ride of a vehicle. Whereas, the use of spring elements having lower spring rates (i.e., a softer or more-compliant spring) will transmit a lesser amount of the inputs to the sprung mass but can also, undesirably, permit increased deflection under load.

Notwithstanding the common usage and overall success of conventional gas spring devices that include a piston assembly with a compliant support structure, it is believed beneficial to continue to develop piston assemblies that may advance the art of gas spring devices, such as by developing constructions that can provide desired performance characteristics and/or other features.

BRIEF SUMMARY

One example of an end member assembly in accordance with the subject matter of the present disclosure that has a longitudinal axis and is dimensioned for use in forming an associated gas spring assembly. The end member assembly can include a compliant support structure and an end member body. The compliant support structure can include a base member and a compliant mount assembly that is operatively connected to the base member. The compliant mount assembly can include at least one rigid element and at least one compliant element that are permanently attached to one another such that a substantially fluid-tight connection is formed therebetween. The end member body can include an end wall and a side wall. The end wall can extend transverse to the axis and can be dimensioned for securement to an associated flexible spring member. The side wall can extend from along the end wall in an axial direction toward the compliant support structure. The end member body supported on the compliant support structure such that the side wall of the end member body extends along and at least partially overlaps the compliant support structure.

One example of a gas spring assembly in accordance with the subject matter of the present disclosure can include a flexible spring member having a longitudinal axis. The flexible spring member can include a flexible wall that can extend peripherally about the longitudinal axis and longitudinally between opposing first and second ends to at least partially define a spring chamber. An end member can be secured across the first end of the flexible spring member such that a substantially fluid-tight seal is formed therebetween. An end member assembly according to the foregoing paragraph can be secured across the second end of the flexible spring member such that a substantially fluid-tight seal is formed therebetween.

One example of a suspension system in accordance with the subject matter of the present disclosure can include a pressurized gas system and at least one gas spring assembly according to the foregoing paragraph in fluid communication with the pressurized gas system.

DETAILED DESCRIPTION

Figure 1:
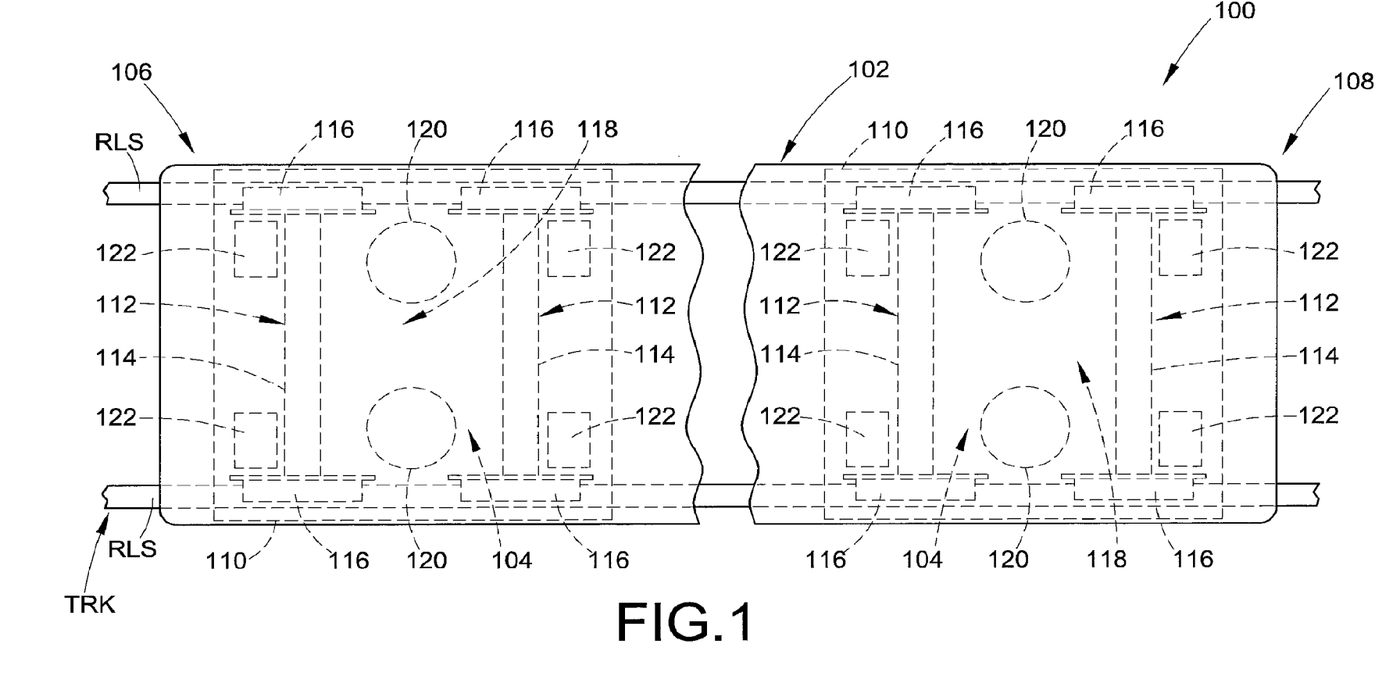
FIG. 1 is a schematic representation of one example of a rail vehicle including a suspension system in accordance with the subject matter of the present disclosure.

Turning now to the drawings, wherein the showings are for the purpose of illustrating exemplary embodiments of the present novel concept and not for the purpose of limiting the same, FIG. 1 illustrates one example of a vehicle including a suspension system in accordance with the subject matter of the present disclosure, such as a vehicle 100 that is adapted for movement or otherwise displaceable along a track TRK that is at least partially formed by rails RLS of an indefinite length. It will be appreciated that the subject matter of the present disclosure is broadly applicable for use in a wide variety of applications, and that rail vehicle 100 merely represents one example of a suitable application. Rail vehicle 100 is shown being representative of rolling stock (e.g., a railcar) rather than an engine or traction drive vehicle. However, this representative use is merely exemplary and not intended to be limiting.

Rail vehicle 100 includes a vehicle body 102 supported on one or more frame and wheel assemblies 104, two of which are shown in FIG. 1. In some cases, frame and wheel assemblies 104 may be referred to in the art as "trucks," "rail bogies" or simply "bogies," and such terms may be used herein in an interchangeable manner. Bogies 104 are shown as being disposed toward opposing ends 106 and 108 of rail vehicle 100.

Bogies 104 are shown in FIG. 1 as including a frame 110 as well as one or more wheel sets 112 that are typically formed by an axle 114 and a pair of spaced-apart wheels 116. Normally, bogies 104 include at least two wheel sets, such as is shown in FIG. 1, for example, that are operatively connected to the frame in manner suitable to permit the wheels to roll along rails RLS of track TRK. In many cases, a primary suspension arrangement (not shown) is operatively connected between the wheels sets and the frame to permit relative movement therebetween. Bogies 104 are also shown as including a secondary suspension system 118 that includes at least one gas spring assembly. In the exemplary arrangement shown in FIGS. 1 and 2, bogies 104 include two gas spring assemblies 120 that are operatively connected between frame 110 and vehicle body 102 to permit relative movement therebetween.

Rail vehicles, such as rail vehicle 100, for example, typically include a braking system with one or more brakes operatively associated with each wheel set. In the exemplary arrangement in FIG. 1, two brakes 122 are shown as being operatively associated with each of wheel sets 112 with one brake disposed adjacent each of wheels 116. It will be appreciated, however, that other arrangements could alternately be used.

Additionally, rail vehicles, such as rail vehicle 100, for example, typically include at least one pneumatic system that is operatively associated therewith. In many cases, components of the one or more pneumatic systems can be distributed along the length of a train that is formed from a plurality of rail vehicles, such as one or more traction-drive engines and one or more rolling stock vehicles, for example. In such cases, each individual rail vehicle will include one or more portions of the pneumatic system. Usually, these one or more portions are serially connected together to form an overall pneumatic system of a train.

Typical pneumatic systems include two or more separately controllable portions, such as a pneumatic braking system that is operatively associated with the vehicle brakes (e.g., brakes 122) and a pneumatic supply system that is operatively associated with the other pneumatically-actuated devices of the rail vehicle, such as the secondary suspension system, for example. As such, rail vehicles typically include a dedicated conduit for each of these two systems. Such conduits normally extend lengthwise along the vehicle body and are often individually referred to as a brake pipe and a supply pipe.

Figure 2:
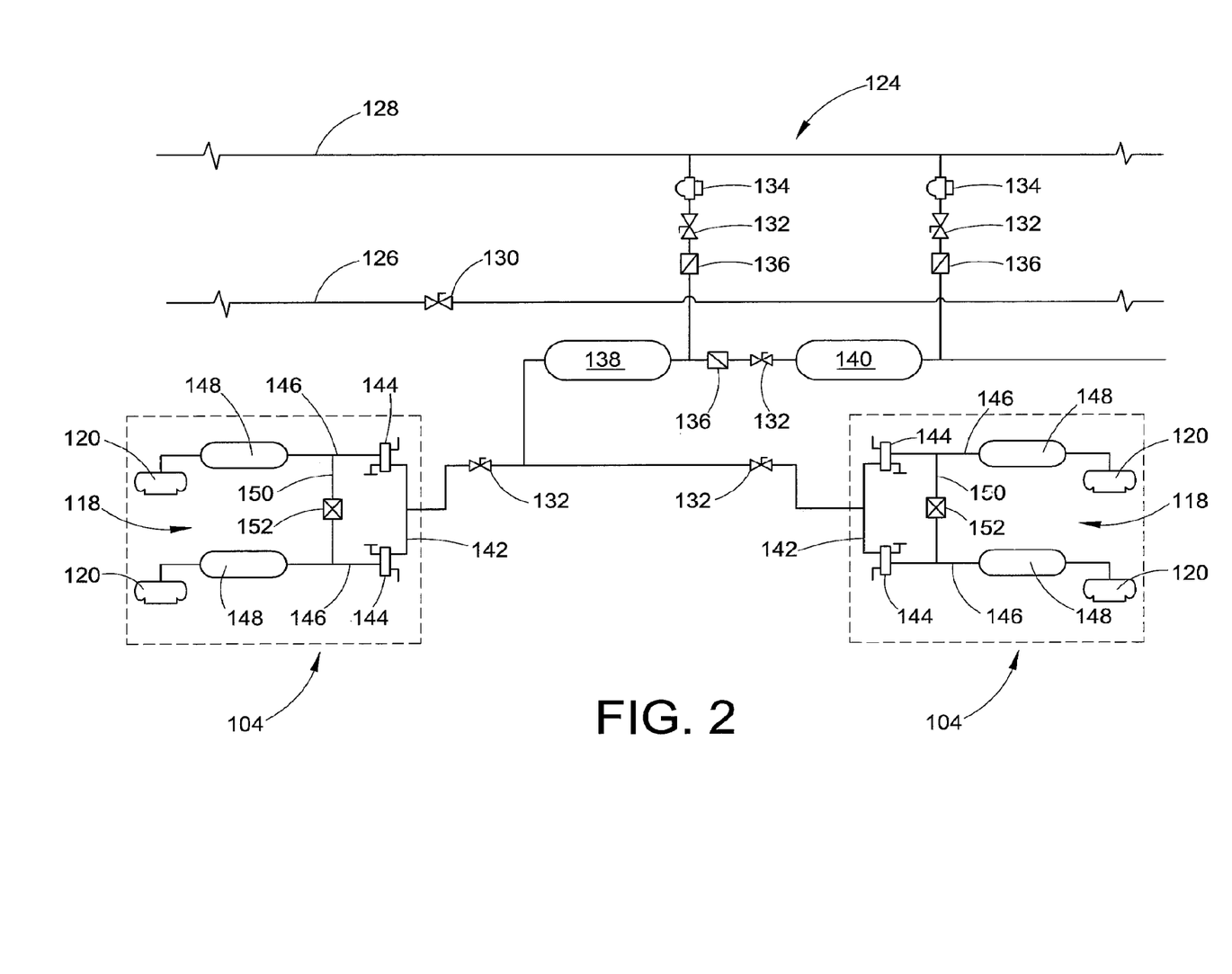
FIG. 2 is a schematic representation of one example of a pneumatic gas system operatively associated with the suspension system in FIG. 1.

FIG. 2 illustrates one example of a pneumatic system 124 that is operatively associated with rail vehicle 100 and includes a braking system (not numbered) with a brake pipe 126 in fluid communication with at least brakes 122 (FIG. 1) and a pneumatic supply system (not numbered) with a supply pipe 128 in fluid communication with at least gas spring assemblies 120 of secondary suspension system 118. It will be recognized and appreciated that pneumatic system 124 will include a wide variety of other components and devices. For example, the braking system can include one or more isolation valves 130 that can be fluidically connected along brake pipe 126. As other examples, the pneumatic supply system can include one or more isolation valves 132, one or more filters 134 and/or one or more non-return valves 136 (which may be alternately referred to as one-way or check valves). The pneumatic supply system can also include one or more reservoirs or other pressurized gas storage devices. In the arrangement shown in FIG. 2, for example, the pneumatic supply system includes a reservoir 138 that is operative to store a quantity of pressurized gas for use in supplying gas spring assemblies 120 of the secondary suspension system, and a reservoir 140 that is operative to store a quantity of pressurized gas for use as the auxiliary reservoir of the braking system.

Generally, certain components of the braking system, such as brakes 122, for example, as well as certain components of the pneumatic supply system are supported on or otherwise operatively associated with one of bogies 104 of rail vehicle 100. For example, supply lines 142 can fluidically interconnect bogies 104 with the pneumatic supply system. Supply lines 142 are shown as being fluidically connected with one or more leveling valves 144 that are operatively connected with gas spring assemblies 120, such as by way of gas lines 146, and are selectively operable to transfer pressurized gas into and out of the gas spring assemblies. In some cases, a pressurized gas storage device or reservoir 148 can, optionally, be fluidically connected along gas line 146 between leveling valve 144 and gas spring assembly 120. Additionally, a cross-flow line 150 can, optionally, be connected in fluid communication between two or more of gas lines 146. In some cases, a control valve 152, such as a duplex check valve, for example, can be fluidically connected along cross-flow line 150, such as is shown in FIG. 2, for example.

Figure 3:
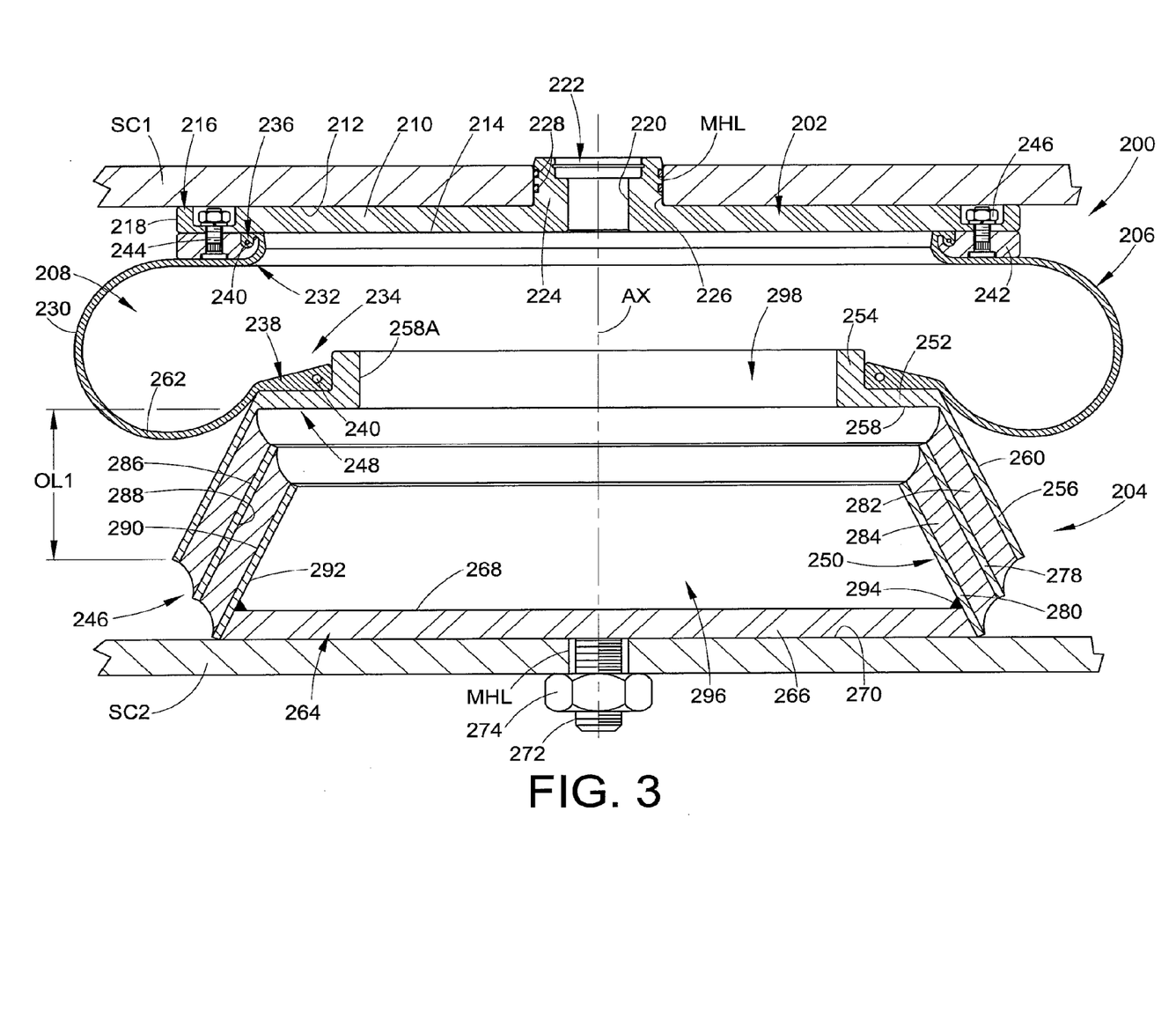
FIG. 3 is a side view, in partial cross-section, of one example of a gas spring assembly in accordance with the subject matter of the present disclosure.

One example of a gas spring assembly in accordance with the subject matter of the present disclosure, such as may be suitable for use as one or more of gas spring assemblies 120 in FIGS. 1 and 2, for example, is shown as gas spring assembly 200 in FIG. 3. The gas spring assembly has a longitudinal axis AX and includes an end member (or end member assembly) 202, an end member (or end member assembly) 204 spaced longitudinally from end member 202 and a flexible spring member (or flexible sleeve) 206 that extends peripherally about the longitudinal axis and is secured between the end members to at least partially define a spring chamber 208.

Gas spring assembly 200 can be disposed between associated sprung and unsprung masses of an associated vehicle in any suitable manner. For example, one end member can be operatively connected to an associated sprung mass with the other end member disposed toward and operatively connected to the associated unsprung mass. In the embodiment shown in FIG. 3, for example, end member 202 is secured on or along a structural component SC1, such as an associated vehicle body 102 in FIG. 1, for example, and can be secured thereon in any suitable manner. As another example, end member 204 is secured on or along a structural component SC2, such as an associated rail bogie 104 in FIG. 1, for example, and can be secured thereon in any suitable manner.

In the exemplary arrangement in FIG. 3, end member 202 is shown as taking the form of a top plate having a plate wall 210 that has opposing surfaces 212 and 214 such that a plate height (not identified) is at least partially defined therebetween. Plate wall 210 is shown as being generally planar and extending outwardly to an outer periphery 216. In some cases, plate wall 210 can have a generally circular shape. As such, in some cases, an outer peripheral surface 218 extending in a heightwise direction have a generally cylindrical shape. A passage surface 220 at least partially defines a gas transfer passage 222 extending through the end member such that pressurized gas can be transferred into and out of spring chamber 208, such as by way of pneumatic system 124 (FIG. 2) for example. In some cases, the end member can include a projection or boss 224 that extends from along plate wall 210 in a longitudinal direction. In the exemplary arrangement shown in FIG. 3, projection 224 extends axially outwardly away from spring chamber 208.

As mentioned above, one or more securement devices (not shown) can be used to secure or otherwise interconnect the end members of the gas spring assembly with corresponding structural components. In some cases, projection 224 can include an outer surface 226 that is dimensioned for receipt within a passage or mounting hole MHL that extends through structural component SC1. Additionally, one or more sealing elements 228 can, optionally, be included that are disposed between or otherwise at least partially form a substantially fluid-tight connection between the end member and the structural component, such as between projection 224 and mounting hole MHL, for example. In some cases, structural component SC1 can, optionally, at least partially define an external reservoir suitable for storing a quantity of pressurized gas.

Flexible sleeve 206 can be of any suitable size, shape, construction and/or configuration. As one example, flexible sleeve 206 can include a flexible wall 230 that is at least partially formed from one or more layers or plies (not identified) of elastomeric material (e.g., natural rubber, synthetic rubber and/or thermoplastic elastomer) and can optionally include one or more plies or layers of filament reinforcing material (not shown). Flexible wall 230 is shown extending in a longitudinal direction between opposing ends 232 and 234. In some cases, the flexible wall can, optionally, include a mounting bead dispose along either one or both of ends 232 and 234. In the arrangement shown in FIG. 3, mounting beads 236 and 238 are shown as being respectively disposed along ends 232 and 234. In some cases, the mounting beads can, optionally, include a reinforcing element, such as an endless, annular bead wire 240, for example.

It will be appreciated, that the ends of flexible sleeve 206 can be secured on, along or otherwise interconnected between end members 202 and 204 in any suitable manner. As one example, gas spring assembly 200 can include one or more bead retaining elements that engage at least a portion of the flexible sleeve and maintain the flexible sleeve in substantially fluid-tight engagement with the corresponding end member (e.g., end member 202). In the arrangement shown in FIG. 3, end 232 of flexible wall 230 is disposed in abutting engagement with surface 214 of plate wall 210. A bead retaining element in the form of an endless, annular bead ring 242 captures at least a portion of mounting bead 236 and is shown as being secured on or along plate wall 210 by way of a plurality of securement devices. In the arrangement shown, the plurality of securement devices include threaded fasteners 244 that extend through mounting holes (not numbered) in bead ring 242 and corresponding mounting holes (not numbered) in plate wall 210. A lock washer (not numbered) and a threaded nut 246 are received along and operatively engage each of the threaded fasteners to secure bead ring 242 in abutting engagement along surface 214 of plate wall 210. It will be appreciated, however, that other retaining arrangements could alternately be used.

End member 204 is shown in FIG. 3 as being one example of a piston assembly in accordance with the subject matter of the present disclosure. End member 204 includes a piston body 248 and a compliant support structure 250 that are operatively connected to one another. Piston body 248 includes an end wall 252 and a mounting wall 254. End wall 252 is shown as being disposed transverse to axis AX. Mounting wall 254 is disposed radially inwardly of end wall 252 and projects axially therefrom in a direction toward end member 202. Piston body 248 also includes a side wall 256 that is disposed radially outwardly of end wall 252 and extends projects axially therefrom in a direction away from end member 202. In a preferred arrangement, side wall 256 can extend axially beyond at least a portion of compliant support structure 250 such that an overlap between piston body 248 and compliant support structure 250 is provided, as is represented in FIG. 3 by reference dimension OL1. In such case, at least a portion (e.g., a rolling lobe) of flexible wall 230 can be supported by side wall 256 of piston body 248 upon displacement toward compliant support structure 250.

Piston body 248 also includes inner and outer surfaces 258 and 260 that include corresponding portions (not individually numbered) disposed along walls 252, 254 and 256. The outer surface portions disposed along end wall 252 and mounting wall 254 at least partially define a mounting seat for receivingly engaging mounting bead 238 of flexible wall 230. In the arrangement shown in FIG. 3, mounting bead 238 is compressively fitted along mounting wall 254 and into abutting engagement with end wall 252 such that a substantially fluid-tight seal is formed therebetween. It will be appreciated, however, that other configurations and/or arrangements could alternately be used. As such, flexible wall 230 extends radially outwardly beyond mounting wall 254 and end wall 252, and extends along side wall 256 such that a rolling lobe 262 is formed along the flexible wall. Side wall 256 is shown as having a generally frustoconical shape and rolling lobe 262 is displaceable along side wall 256 as the gas spring assembly is axially displaced between extended and compressed conditions, such as may occur during dynamic use in operation. It will be appreciated that other shapes and/or configurations can alternately be used, such as may be useful to provide desired performance characteristics, for example.

Piston body 248 can be supported on or along compliant support structure 250 in any suitable manner. As one example, compliant support structure 250 is shown as including a base member 264 that includes a base wall 266 and a securement feature suitable for operatively connecting the base wall to an associated structural component. Base wall includes opposing inner and outer surfaces 268 and 270. In the arrangement shown in FIG. 3, for example, the securement feature includes a threaded stud 272 projects axially outwardly from along surface 270 of base wall 266 in a direction opposite end member 202 and extends through a mounting hole MHL in structural component SC2. A threaded nut 274 is shown as engaging the threaded stud to secure end member 204 along the structural component. It will be appreciated, however, that other arrangements could alternately be used.

Piston body 248 is supported on base member 264 by a compliant mount assembly 276 that together with base member 264 at least partially forms compliant support structure 250. Compliant mount assembly 276 includes at least one rigid element and at least one comparatively compliant element that are stacked, sandwiched or otherwise disposed in serial relation to one another. In a preferred arrangement, the at least one rigid element is formed from a metal (e.g., steel and/or aluminum) or rigid thermoplastic (e.g., polyamide), and the at least one compliant element is formed from an elastomeric material (e.g., natural rubber, synthetic rubber and/or thermoplastic elastomer). Additionally, in a preferred arrangement, the one or more rigid elements and the one or more compliant elements are permanently attached to one another (i.e., inseparable without damage, destruction or material alteration of at least one of the component parts).

In the exemplary arrangement shown in FIG. 3, compliant mount assembly 276 includes a plurality of rigid elements, which include rigid elements 278 and 280, and a plurality of compliant elements, which include compliant elements 282 and 284. Rigid element 278 is identified as having opposing surfaces 286 and 288, and rigid element 280 is identified as having opposing surfaces 290 and 292. In the configuration shown in FIG. 3, rigid elements 278 and 280 are formed from thin-walled material and have a frustoconical shape with a hollow interior. Compliant element 282 is attached to inner surface 258 of piston body 248 and surface 286 of rigid element 278. Compliant element 284 is attached to surface 288 of rigid element 278 and surface 290 of rigid element 280. Additionally, it will be appreciated that compliant mount assembly 276 can be attached or otherwise operatively connected to base member 264 in any suitable manner. As one example, rigid element 280 can be fixedly attached to base wall 266 of base member 264 by way of a flowed-material joint 294. It will be appreciated, however, that other joints and/or connections could alternately be used.

As discussed above, it will be appreciated that the rigid and compliant elements as well as the piston body can be attached to one another in any suitable manner. In a preferred arrangement, substantially fluid-tight joints or connections are formed between compliant element 282, piston body 248 and rigid element 278, and between compliant element 284, rigid element 278 and rigid element 280. In some cases, such substantially fluid-tight joints or connections can be formed by way of one or more processes and/or can include the use of one or more treatments and/or materials. Exemplary processes can include molding, adhering, curing and/or vulcanizing. Further, in a preferred arrangement, flowed-material joint 294 forms a substantially fluid-tight connection between rigid element 280 and base member 264. In this manner, a piston chamber 296 can be formed within end member 204 that is substantially fluid-tight and can retain a quantity of pressurized gas at a desired pressure for an extended period of time, such as a period of hours, days, weeks or months, for example. In some cases, portion 258A of inner surface 258 can at least partially define a passage 298 through which spring chamber 208 and reservoir chamber 296 can fluidically communication with one another. In some cases, passage 298 may be of sufficient size such that chambers 208 and 296 substantially function as a single volume of pressurized gas.

Figure 4:
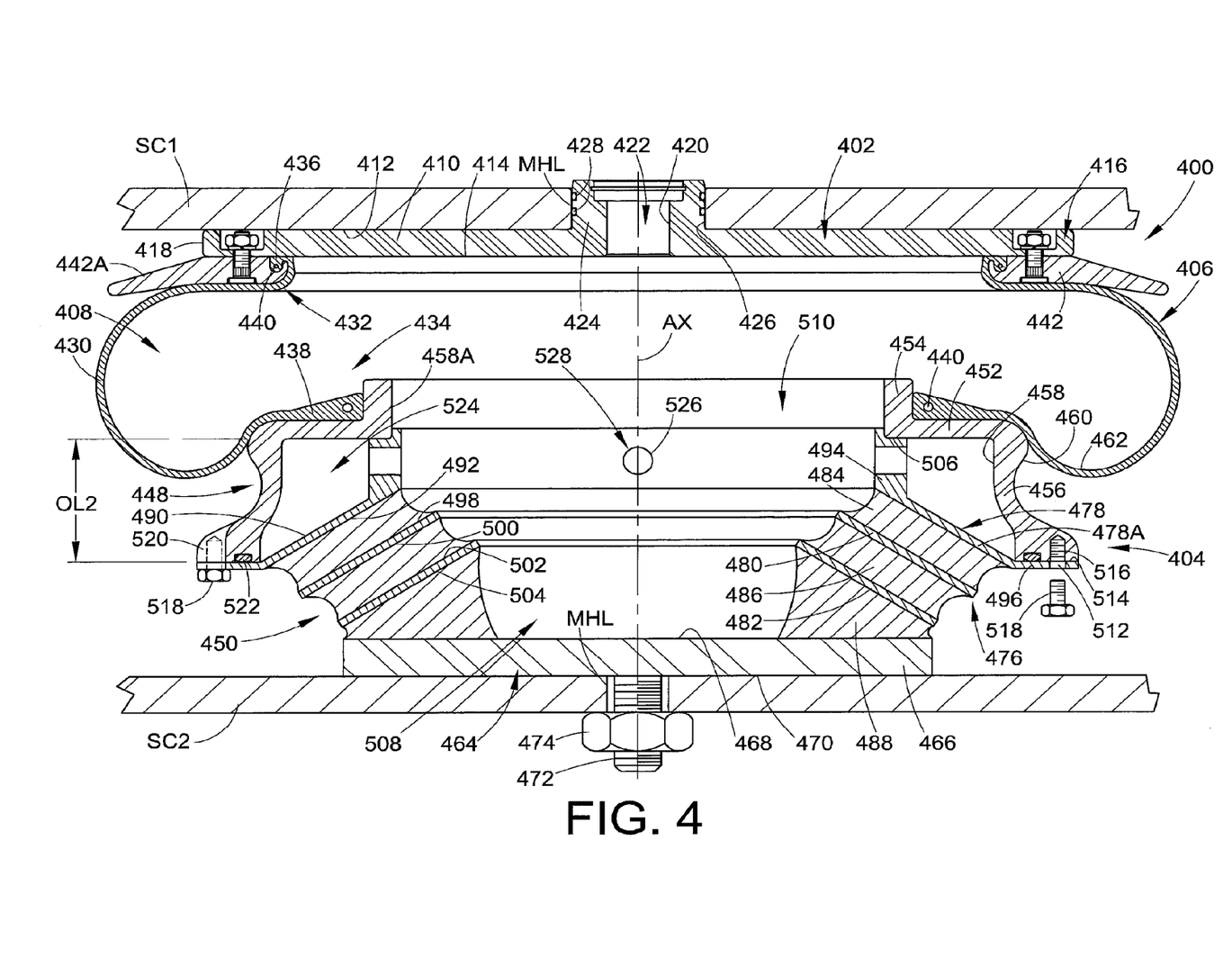
FIG. 4 is a side view, in partial cross-section, of another example of a gas spring assembly in accordance with the subject matter of the present disclosure.

Another example of a gas spring assembly in accordance with the subject matter of the present disclosure, such as may be suitable for use as one or more of gas spring assemblies 120 in FIGS. 1 and 2, for example, is shown as gas spring assembly 400 in FIG. 4. The gas spring assembly has a longitudinal axis AX and includes an end member (or end member assembly) 402, an end member (or end member assembly) 404 spaced longitudinally from end member 402 and a flexible sleeve 406 that extends peripherally about the longitudinal axis and is secured between the end members to at least partially define a spring chamber 408.

Gas spring assembly 400 can be disposed between associated sprung and unsprung masses of an associated vehicle in any suitable manner. For example, one end member can be operatively connected to an associated sprung mass with the other end member disposed toward and operatively connected to the associated unsprung mass. In the embodiment shown in FIG. 4, for example, end member 402 is secured on or along a structural component SC1, such as an associated vehicle body 102 in FIG. 1, for example, and can be secured thereon in any suitable manner. As another example, end member 404 is secured on or along a structural component SC2, such as an associated rail bogie 104 in FIG. 1, for example, and can be secured thereon in any suitable manner.

In the exemplary arrangement in FIG. 4, end member 402 is shown as taking the form of a top plate having a plate wall 410 that has opposing surfaces 412 and 414 such that a plate height (not identified) is at least partially defined therebetween. Plate wall 410 is shown as being generally planar and extending outwardly to an outer periphery 416. In some cases, plate wall 410 can have a generally circular shape. As such, in some cases, an outer peripheral surface 418 extending in a heightwise direction have a generally cylindrical shape. A passage surface 420 at least partially defines a gas transfer passage 422 extending through the end member such that pressurized gas can be transferred into and out of spring chamber 408, such as by way of pneumatic system 124 (FIG. 2) for example. In some cases, the end member can include a projection or boss 424 that extends from along plate wall 410 in a longitudinal direction. In the exemplary arrangement shown in FIG. 4, projection 424 extends axially outwardly away from spring chamber 408.

As mentioned above, one or more securement devices (not shown) can be used to secure or otherwise interconnect the end members of the gas spring assembly with corresponding structural components. In some cases, projection 424 can include an outer surface 426 that is dimensioned for receipt within a passage or mounting hole MHL that extends through structural component SC1. Additionally, one or more sealing elements 428 can, optionally, be included that are disposed between or otherwise at least partially form a substantially fluid-tight connection between the end member and the structural component, such as between projection 424 and mounting hole MHL, for example. In some cases, structural component SC1 can, optionally, at least partially define an external reservoir suitable for storing a quantity of pressurized gas.

Flexible sleeve 406 can be of any suitable size, shape, construction and/or configuration. As one example, flexible sleeve 406 can include a flexible wall 430 that is at least partially formed from one or more layers or plies (not identified) of elastomeric material (e.g., natural rubber, synthetic rubber and/or thermoplastic elastomer) and can optionally include one or more plies or layers of filament reinforcing material (not shown). Flexible wall 430 is shown extending in a longitudinal direction between opposing ends 432 and 434. In some cases, flexible wall can, optionally, include a mounting bead dispose along either one or both of ends 432 and 434. In the arrangement shown in FIG. 4, mounting beads 436 and 438 are shown as being respectively disposed along ends 432 and 434. In some cases, the mounting beads can, optionally, include a reinforcing element, such as an endless, annular bead wire 440, for example.

It will be appreciated, that the ends of flexible sleeve 406 can be secured on, along or otherwise interconnected between end members 402 and 404 in any suitable manner. As one example, gas spring assembly 400 can include one or more bead retaining elements that engage at least a portion of the flexible sleeve and maintain the flexible sleeve in substantially fluid-tight engagement with the corresponding end member (e.g., end member 402). In the arrangement shown in FIG. 4, end 432 of flexible wall 430 is disposed in abutting engagement with surface 414 of plate wall 410. A bead retaining element in the form of an endless, annular bead skirt 442 captures at least a portion of mounting bead 436 and is shown as being secured on or along plate wall 410 by way of a plurality of securement devices. Additionally, bead skirt 442 is shown as including a radially outwardly-extending wall portion 442A having a cross-sectional profile suitable for improving stability and/or control of the gas spring assembly during lateral (i.e., transverse) movement of the end members relative to one another. In the arrangement shown, the plurality of securement devices include threaded fasteners 444 that extend through mounting holes (not numbered) in bead skirt 442 and corresponding mounting holes (not numbered) in plate wall 410. A lock washer (not numbered) and a threaded nut 446 are received along and operatively engage each of the threaded fasteners to secure bead skirt 442 in abutting engagement along surface 414 of plate wall 410. It will be appreciated, however, that other retaining arrangements could alternately be used.

End member 404 is shown in FIG. 4 as being one example of a piston assembly in accordance with the subject matter of the present disclosure. End member 404 includes a piston body 448 and a compliant support structure 450 that are operatively connected to one another. Piston body 448 includes an end wall 452 and a mounting wall 454. End wall 452 is shown as being disposed transverse to axis AX. Mounting wall 454 is disposed radially inwardly of end wall 452 and projects axially therefrom in a direction toward end member 402. Piston body 448 also includes a side wall 456 that is disposed radially outwardly of end wall 452 and extends projects axially therefrom in a direction away from end member 402. It will be appreciated that the side wall can have any suitable cross-sectional shape, profile and/or configuration, such as being approximately linear (as shown in FIG. 3) or curvilinear (as shown in FIG. 4), for example. In a preferred arrangement, side wall 456 can extend axially beyond at least a portion of compliant support structure 450 such that an overlap between piston body 448 and compliant support structure 450 is provided, as is represented in FIG. 4 by reference dimension OL2. In such case, at least a portion (e.g., a rolling lobe) of flexible wall 430 can be supported by side wall 456 of piston body 448 upon displacement toward compliant support structure 450.

Piston body 448 also includes inner and outer surfaces 458 and 460 that include corresponding portions (not individually numbered) disposed along walls 452, 454 and 456. The outer surface portions disposed along end wall 452 and mounting wall 454 at least partially define a mounting seat for receivingly engaging mounting bead 438 of flexible wall 430. In the arrangement shown in FIG. 4, mounting bead 438 is compressively fitted along mounting wall 454 and into abutting engagement with end wall 452 such that a substantially fluid-tight seal is formed therebetween. It will be appreciated, however, that other configurations and/or arrangements could alternately be used. As such, flexible wall 430 extends radially outwardly beyond mounting wall 454 and end wall 452, and extends along side wall 456 such that a rolling lobe 462 is formed along the flexible wall. Side wall 456 is shown as having a curved cross-sectional shape, and rolling lobe 462 is displaceable along side wall 456 as the gas spring assembly is axially displaced between extended and compressed conditions, such as may occur during dynamic use in operation. It will be appreciated that other shapes and/or configurations can alternately be used, such as may be useful to provide desired performance characteristics, for example.

Piston body 448 can be supported on or along compliant support structure 450 in any suitable manner. As one example, compliant support structure 450 is shown as including a base member 464 that includes a base wall 466 and a securement feature suitable for operatively connecting the base wall to an associated structural component. Base wall includes opposing inner and outer surfaces 468 and 470. In the arrangement shown in FIG. 4, for example, the securement feature includes a threaded stud 472 projects axially outwardly from along surface 470 of base wall 466 in a direction opposite end member 402 and extends through a mounting hole MHL in structural component SC2. A threaded nut 474 is shown as engaging the threaded stud to secure end member 404 along the structural component. It will be appreciated, however, that other arrangements could alternately be used.

Piston body 448 is supported on base member 464 by a compliant mount assembly 476 that together with base member 464 at least partially forms compliant support structure 450. Compliant mount assembly 476 includes at least one rigid element and at least one comparatively compliant element that are stacked, sandwiched or otherwise disposed in serial relation to one another. In a preferred arrangement, the at least one rigid element is formed from a metal (e.g., steel and/or aluminum) or rigid thermoplastic (e.g., polyamide), and the at least one compliant element is formed from an elastomeric material (e.g., natural rubber, synthetic rubber and/or thermoplastic elastomer). Additionally, in a preferred arrangement, the one or more rigid elements and the one or more compliant elements are permanently attached to one another (i.e., inseparable without damage, destruction or material alteration of at least one of the component parts).

In the exemplary arrangement shown in FIG. 4, compliant mount assembly 476 includes a plurality of rigid elements, which can include rigid elements 478, 480 and 482, and a plurality of compliant elements, which can include compliant elements 484, 486 and 488. Rigid element 478 is identified as having opposing surfaces 490 and 492, and includes a support portion 494 and a mounting portion 496. Rigid element 480 is identified as having opposing surfaces 498 and 500, and rigid element 482 is identified as having opposing surfaces 502 and 504. In the configuration shown in FIG. 4, rigid elements 482 and 482 as well as a portion 478A of rigid element 478 are formed from thin-walled material and have a frustoconical shape with a hollow interior.

As identified above, however, rigid element also includes support portion 494 that extends axially outwardly from portion 478A and is dimensioned to abuttingly engage at least a portion of piston body 448, such as a portion of end wall 452 and/or a portion of mounting wall 454, for example. In a preferred arrangement, support portion 494 includes a shoulder wall 506 that is dimensioned to receivingly engage the piston body, such as to inhibit lateral displacement (i.e., movement in a direction transverse to axis AX) of piston body 448 and rigid element 494 relative to one another.

Compliant element 484 is attached to surface 492 of rigid element 478 and surface 498 of rigid element 480. Compliant element 486 is attached to surface 500 of rigid element 480 and surface 502 of rigid element 482. Additionally, it will be appreciated that compliant mount assembly 476 can be attached or otherwise operatively connected to base member 464 in any suitable manner. As one example, rigid element 482 can be fixedly attached to the base wall of the base member by way of a flowed-material joint (not shown). As another example, rigid element 482 can be compliantly secured along base wall 466 of base member 464 by way of a compliant element or joint, such as compliant element 488, for example. It will be appreciated, however, that other joints and/or connections could alternately be used.

As discussed above, it will be appreciated that the rigid and compliant elements as well as the piston body can be attached to one another in any suitable manner. In a preferred arrangement, substantially fluid-tight joints or connections are formed between compliant element 484 and rigid elements 478 and 480, between compliant element 486 and rigid elements 480 and 482, and between compliant element 488, rigid element 482 and base wall 466. In some cases, such substantially fluid-tight joints or connections can be formed by way of one or more processes and/or can include the use of one or more treatments and/or materials. Exemplary processes can include molding, adhering, curing and/or vulcanizing. In this manner, a piston chamber 508 can be formed within end member 404 that is substantially fluid-tight and can retain a quantity of pressurized gas at a desired pressure for an extended period of time, such as a period of hours, days, weeks or months, for example. In some cases, portion 458A of inner surface 458 along mounting wall 454 can at least partially define a passage 510 through which spring chamber 408 and piston chamber 508 can fluidically communication with one another. In some cases, passage 510 may be of sufficient size such that chambers 408 and 508 substantially function as a single volume of pressurized gas.

End member 404 differs from end member 204, which was previously described in connection with FIG. 3, in numerous respects, which can be utilized in any suitable combination with other features and/or elements described herein. As one example, end member 204 includes a piston body 248 that is, in a preferred embodiment, permanently attached to an adjacent compliant element (e.g., compliant element 282). Whereas, end member 404 includes a piston body 448 that is removably supported on rigid element 478. In the arrangement shown in FIG. 4, piston body 448 is disposed in abutting engagement along support portion 494 and mounting portion 496 of rigid element 478. It will be appreciated that the piston body can be attached to or otherwise retained on the compliant support structure in any suitable manner. As one example, mounting portion 496 can include one or more holes or openings 512 extending therethrough and disposed in approximate alignment with one or more securement features disposed along an end wall 514 of piston body 448. In the arrangement shown, for example, the one or more securement features can take the form of axially-aligned, threaded passages 516 that extend into the piston body from along end wall 514. In such case, a corresponding plurality of threaded fasteners 518 can extend through the opening in mounting portion 496 and threadably engage passages 516 to secured end wall 514 and mounting portion 496 in abutting engagement with one another. In some cases, projections or bosses 520 can be disposed in spaced-apart relation to one another along the outer periphery of side wall 456 to provide material for corresponding securement features.

As described above, end member 404 includes a piston chamber 508 that is at least partially formed as a result of the substantially fluid-tight connections between the components of the end member. As such, it may be desirable to maintain a substantially fluid-tight connection between piston body 448 and compliant support structure 450, which can be achieved in any suitable manner, such as by way of one or more flowed-material joints being formed between the piston body and the compliant support structure. Alternately, one or more sealing elements, such as endless annular O-rings, for example, could be disposed between the piston body and the compliant support structure, such as along or otherwise adjacent the interface between the piston body and shoulder wall 506, for example.

In the exemplary arrangement shown in FIG. 4, however, the sealing element is sealingly disposed between rigid element 478 and piston body 448. Specifically, an endless annular groove (not numbered) extends axially into the piston body from along end wall 514 and a sealing element 522 is at least partially received within the groove. In this manner, a substantially fluid-tight seal can be formed and maintained between the piston body and the compliant support structure. It will be recognized, however, that a secondary chamber 524 is at least partially defined within end member 404 between surface 458 of the piston body and surface 490 of rigid element 478. As such, positioning sealing element 522 fluidically outwardly of secondary chamber 524 permits the secondary chamber to be maintained in a substantially fluid-tight condition and suitable for use in storing or otherwise containing a quantity of pressurized gas. In some cases, secondary chamber 524 can be placed in fluid communication with one or more of piston chamber 508 and/or spring chamber 408. As one example of such an arrangement, one or more passage walls 526 can extend through support portion 494 of rigid element 478 and can at least partially define a corresponding number of one or more communication passages 528 that permit pressurized gas transfer into, out of and/or otherwise between chambers 408, 508 and 524.

As used herein with reference to certain features, elements, components and/or structures, numerical ordinals (e.g., first, second, third, fourth, etc.) may be used to denote different singles of a plurality or otherwise identify certain features, elements, components and/or structures, and do not imply any order or sequence unless specifically defined by the claim language. Additionally, the terms "transverse," and the like, are to be broadly interpreted. As such, the terms "transverse," and the like, can include a wide range of relative angular orientations that include, but are not limited to, an approximately perpendicular angular orientation. Also, the terms "circumferential," "circumferentially," and the like, are to be broadly interpreted and can include, but are not limited to circular shapes and/or configurations. In this regard, the terms "circumferential," "circumferentially," and the like, can be synonymous with terms such as "peripheral," "peripherally," and the like.

Furthermore, the phrase "flowed-material joint" and the like, if used herein, are to be interpreted to include any joint or connection in which a liquid or otherwise flowable material (e.g., a melted metal or combination of melted metals) is deposited or otherwise presented between adjacent component parts and operative to form a fixed and substantially fluid-tight connection therebetween. Examples of processes that can be used to form such a flowed-material joint include, without limitation, welding processes, brazing processes and soldering processes. In such cases, one or more metal materials and/or alloys can be used to form such a flowed-material joint, in addition to any material from the component parts themselves. Another example of a process that can be used to form a flowed-material joint includes applying, depositing or otherwise presenting an adhesive between adjacent component parts that is operative to form a fixed and substantially fluid-tight connection therebetween. In such case, it will be appreciated that any suitable adhesive material or combination of materials can be used, such as one-part and/or two-part epoxies, for example.

Further still, the term "gas" is used herein to broadly refer to any gaseous or vaporous fluid. Most commonly, air is used as the working medium of gas spring devices, such as those described herein, as well as suspension systems and other components thereof. However, it will be understood that any suitable gaseous fluid could alternately be used.

It will be recognized that numerous different features and/or components are presented in the embodiments shown and described herein, and that no one embodiment may be specifically shown and described as including all such features and components. As such, it is to be understood that the subject matter of the present disclosure is intended to encompass any and all combinations of the different features and components that are shown and described herein, and, without limitation, that any suitable arrangement of features and components, in any combination, can be used. Thus it is to be distinctly understood claims directed to any such combination of features and/or components, whether or not specifically embodied herein, are intended to find support in the present disclosure.

Thus, while the subject matter of the present disclosure has been described with reference to the foregoing embodiments and considerable emphasis has been placed herein on the structures and structural interrelationships between the component parts of the embodiments disclosed, it will be appreciated that other embodiments can be made and that many changes can be made in the embodiments illustrated and described without departing from the principles hereof. Obviously, modifications and alterations will occur to others upon reading and understanding the preceding detailed description. Accordingly, it is to be distinctly understood that the foregoing descriptive matter is to be interpreted merely as illustrative of the subject matter of the present disclosure and not as a limitation. As such, it is intended that the subject matter of the present disclosure be construed as including all such modifications and alterations.

The invention claimed is:

1. An end member assembly having a longitudinal axis and dimensioned for use in forming an associated gas spring assembly, said end member assembly comprising:
    a compliant support structure including a base member and a compliant mount assembly that is operatively connected to said base member, said compliant mount assembly including at least one rigid element and at least one compliant element that are permanently attached to one another such that a substantially fluid-tight connection is formed therebetween, said at least one rigid element including a support portion extending axially away from said base member toward and end surface, said support portion including one or more fluid communication passages extending therethrough;
    an end member body including an end wall and a side wall, said end wall extending transverse to said axis and dimensioned for securement to an associated flexible spring member, said side wall extending from along said end wall in an axial direction toward said compliant support structure, said end member body supported along said end surface of said support portion of said at least one rigid element of said compliant support structure such that said side wall of said end member body extends along and at least partially overlaps said compliant support structure;
    a first end member chamber at least partially defined by at least one of said compliant support structure and said end member body; and,
    a second end member chamber at least partially defined between said compliant support structure and said end member body with said second end member chamber disposed in fluid communication with said first end member chamber through said one or more fluid communication passages of said support portion.

2. An end member assembly according to claim 1, wherein at least a portion of said side wall has an outer surface with an approximately linear cross-sectional profile that extends from said end wall at an angle such that said outer surface has an approximately frustoconical shape.

3. An end member assembly according to claim 1, wherein at least a portion of said side wall has an outer surface with a curvilinear cross-sectional profile.

4. An end member assembly according to claim 1, wherein said end member body includes a mounting wall projecting from said end wall in an axial direction away from said compliant support structure.

5. An end member assembly according to claim 1, wherein said compliant mount assembly is fixedly attached to said base member such that a substantially fluid-tight connection is formed therebetween.

6. An end member assembly according to claim 1, wherein said compliant mount assembly is flexibly secured to said base member such that a substantially fluid-tight connection is formed therebetween.

7. An end member assembly according to claim 1, wherein said end member body is supported on said compliant support structure such that a substantially fluid-tight seal is formed therebetween.

8. An end member assembly according to claim 7, wherein said end member body is permanently attached to said compliant support structure by one of said at least one compliant element of said complaint mount assembly.

9. An end member assembly according to claim 7, wherein a sealing element is sealingly disposed fluidically outwardly of said second end member chamber between said end member body and one of said at least one rigid element of said compliant mount assembly.

10. An end member assembly according to claim 1, wherein said complaint mount assembly includes two or more rigid elements and two or more compliant elements that are stacked in alternating serial relation to one another.

11. An end member assembly according to claim 1, wherein said at least one rigid element is formed from one of a metal material and a rigid polymeric material, and said at least one compliant element is formed from an elastomeric material.

12. A gas spring assembly comprising:
    a flexible spring member having a longitudinal axis and including a flexible wall extending peripherally about said axis and longitudinally between opposing first and second ends to at least partially define a spring chamber;
    an end member extending across said first end of said flexible spring member and secured thereto such that a substantially fluid-tight seal is formed therebetween; and,
    an end member assembly according to claim 1 extending across said second end of said flexible spring member and secured thereto such that a substantially fluid-tight seal is formed therebetween.

13. A suspension system comprising:
    a pressurized gas system; and,
    at least one gas spring assembly according to claim 12 in fluid communication with said pressurized gas system.

14. An end member assembly according to claim 9, wherein an annular groove extends axially into at least one of said end member body and said one of said at least one rigid element with said groove dimensioned to at least partially receive said sealing element.

15. An end member assembly according to claim 14, wherein said side wall of said end member body terminates at an end surface, and said annular groove extends axially into said side wall of said end member body from along said end surface of said side wall with said sealing element at least partially disposed within said annular groove.

16. An end member assembly having a longitudinal axis and dimensioned for use in forming an associated gas spring assembly, said end member assembly comprising:
- a compliant support structure including a base member and a compliant mount assembly that is operatively connected to said base member, said compliant mount assembly including at least one rigid element and at least one compliant element that are permanently attached to one another such that a substantially fluid-tight connection is formed therebetween, said at least one rigid element including a mounting portion extending transverse to said axis and a support portion disposed radially inward of said mounting portion, said support portion including one or more fluid communication passages extending therethrough;
- an end member body including an end wall and a side wall, said end wall extending transverse to said axis and dimensioned to operatively engage an associated flexible spring member, said side wall extending from along said first end wall in an axial direction toward said compliant support structure and terminating at an end surface that is disposed in abutting engagement with said mounting portion of said compliant support structure to at least partially support said end member body on said compliant support structure with said side wall of said end member body extending along and at least partially overlapping said compliant support structure;
- a first end member chamber at least partially defined by at least one of said compliant support structure and said end member body; and,
- a second end member chamber at least partially defined between said compliant support structure and said end member body with said second end member chamber disposed in fluid communication with said first end member chamber through said one or more fluid communication passages of said support portion.

17. An end member assembly according to claim 16, wherein said complaint mount assembly includes two or more rigid elements and two or more compliant elements that are stacked in alternating serial relation to one another.

18. A gas spring assembly comprising:
- an end member;
- an end member assembly according to claim 16 disposed in spaced relation to said end member; and,
- a flexible spring member having a longitudinal axis and including a flexible wall extending peripherally about said axis and longitudinally between a first end and a second end opposite said first end, said first end operatively secured to said end member such that a substantially fluid-tight seal is formed therebetween and said second end operatively secured to said end member assembly such that a substantially fluid-tight seal is formed therebetween with said spring chamber disposed in fluid communication with said first end member chamber and with said second end member chamber through said one or more fluid communication passages.

19. An end member assembly according to claim 16, wherein an annular groove extends axially into at least one of said end member body and said one of said at least one rigid element with said groove dimensioned to at least partially receive a sealing element.

20. An end member assembly according to claim 19, wherein said side wall of said end member body terminates at an end surface, and said annular groove extends axially into said side wall of said end member body from along said end surface of said side wall with said sealing element at least partially disposed within said annular groove.

\* \* \* \* \*

UNITED STATES PATENT AND TRADEMARK OFFICE
CERTIFICATE OF CORRECTION

PATENT NO. : 9,636,963 B2  
APPLICATION NO. : 14/404296  
DATED : May 2, 2017  
INVENTOR(S) : Smith et al.

Page 1 of 1

It is certified that error appears in the above-identified patent and that said Letters Patent is hereby corrected as shown below:

In the Claims

In Column 14, Line 30, delete "complaint" and insert -- compliant --.

In Column 14, Line 37, delete "complaint" and insert -- compliant --.

In Column 16, Line 6, delete "complaint" and insert -- compliant --.

Signed and Sealed this  
Twenty-fourth Day of April, 2018

Andrei Iancu  
*Director of the United States Patent and Trademark Office*